United States Patent
Mukerjee et al.

(10) Patent No.: US 6,620,535 B2
(45) Date of Patent: Sep. 16, 2003

(54) STRATEGIES FOR PREVENTING ANODE OXIDATION

(75) Inventors: Subhasish Mukerjee, Rochester, NY (US); M. James Grieve, Fairport, NY (US); Kevin Keegan, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 191 days.

(21) Appl. No.: 09/852,245

(22) Filed: May 9, 2001

(65) Prior Publication Data

US 2002/0168555 A1 Nov. 14, 2002

(51) Int. Cl.[7] .......................... H01M 8/00; H01M 8/06; H01M 8/12
(52) U.S. Cl. .................. 429/13; 429/17; 429/30
(58) Field of Search ............... 429/17, 19, 20, 429/21, 30, 40, 44, 13

(56) References Cited

U.S. PATENT DOCUMENTS

| | | | | |
|---|---|---|---|---|
| 4,490,445 A | * | 12/1984 | Hsu | .................. 429/21 X |
| 5,492,777 A | * | 2/1996 | Isenberg et al. | ............... 429/17 |
| 5,527,632 A | * | 6/1996 | Gardner | |
| 5,554,454 A | | 9/1996 | Gardner et al. | ................ 429/19 |
| 5,900,330 A | * | 5/1999 | Katagani | ...................... 429/17 |
| 5,928,805 A | * | 7/1999 | Singh et al. | .............. 429/17 X |
| 5,968,680 A | | 10/1999 | Wolfe et al. | ................... 429/13 |
| 5,993,988 A | * | 11/1999 | Ohara et al. | ................... 429/40 |
| 6,232,009 B1 | * | 5/2001 | Batawi | ........................ 429/40 |
| 6,471,850 B2 | * | 10/2002 | Shiepe et al. | ............. 429/17 X |

* cited by examiner

Primary Examiner—Stephen Kalafut
(74) Attorney, Agent, or Firm—Vincent A. Cichosz

(57) ABSTRACT

A method of preventing anode oxidation in a fuel cell is disclosed comprising applying a negative current to an anode of said fuel cell, such that the anode is disposed in ionic communication with a cathode through an electrolyte. Oxygen is transferred from the anode through the electrolyte to the cathode. A method preventing anode oxidation in a fuel cell by storing and using a reformate and doping an anode are also disclosed.

25 Claims, 1 Drawing Sheet

STRATEGIES FOR PREVENTING ANODE OXIDATION

BACKGROUND

A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposites of an electrolyte. The oxidant passes over the oxygen electrode (cathode) while the fuel passes over the fuel electrode (anode), generating electricity, water, and heat.

The automotive industry has turned to fuel cells, particularly solid oxide fuel cells (SOFCs), to help power automobiles and reduce emissions. SOFCs are constructed entirely of solid-state materials, utilizing an ion conductive oxide ceramic as the electrolyte. A conventional electrochemical cell in a SOFC is comprised of an anode and a cathode with an electrolyte disposed therebetween. In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

The SOFC cell stack also includes conduits or manifolds to allow passage of the fuel and oxidant into and byproducts, as well as excess fuel and oxidant, out of the stack. Generally, oxidant is fed to the structure from a manifold located on one side of the stack, while fuel is provided from a manifold located on an adjacent side of the stack. The fuel and oxidant are generally pumped through the manifolds and introduced to a flow field disposed adjacent to the appropriate electrode. The flow fields that direct the fuel and oxidant to the respective electrodes typically create oxidant and fuel flows across the electrodes that are perpendicular to one another.

Seals must be provided around the edges of the various cell stack components to inhibit crossover of fuel and/or oxidant. For example, seals are disposed between the electrodes and adjacent flow fields, around manifolds, between flow fields and cell separators, and elsewhere. One factor in establishing SOFC reliability is the integrity of these seals.

Leaks in the manifold seals, electrochemical seals, or other defects can lead to the SOFC failure. When the concentration of oxygen on the anode side forms an oxidizing environment, anode oxidation can occur, creating a chemical and volume change that results in mechanical failure of the SOFC cell. To address this problem, conventional SOFC systems provide a continuous supply of fuel (or reformats) to continue to provide hydrogen to the anode (i.e., maintaining a reducing environment) and inhibit anode oxidation. However, during the period of shut down and start up, generally the reformate is not present in the fuel cell and the concentration of oxygen can be elevated, causing anode oxidation.

SUMMARY

The drawbacks and disadvantages of the prior art are overcome by the use of strategies for anode protection.

A method of preventing anode oxidation in a fuel cell is disclosed. The method comprises applying a negative current to an anode of the fuel cell, such that the anode is disposed in ionic communication with a cathode through an electrolyte. Oxygen is transferred from the anode through the electrolyte to the cathode.

A method of preventing anode oxidation in a fuel cell is disclosed. The method comprises doping an anode of the fuel cell with a dopant, such that the anode is disposed in ionic communication with a cathode through an electrolyte. The dopant scavenges at least a portion of the oxygen present at the anode.

A method of preventing anode oxidation of a fuel cell is disclosed. The method comprises storing a reformate in fluid communication with the fuel cell having an anode and a cathode disposed on opposite sides of an electrolyte. The reformate is stored with materials selected from the group consisting of hydrides, carbon nano-tubes, and combinations comprising at least one of the foregoing materials. The reformate is introduced to the anode when the fuel cell has a temperature of about 400° C. to about 1,000° C.

The above described and other features are exemplified by the following figures and detailed description.

BRIEF DESCRIPTION OF THE DRAWINGS

Referring now to the figures, wherein like elements are numbered alike in the several figures.

DETAILED DESCRIPTION

To meet the needs of automobiles, fuel cells have begun to help power vehicles to aid in rapid starts. Fuel cells can provide a continuous source of electrical power to meet the needs of automobiles. Fuel cells require a fuel source (or reformate) and a source of air (or oxygen) to operate and the concentrations of both needs to be monitored to prevent the fouling (or breakdown) of the fuel cell. Since different types of SOFC systems exist, including tubular and planar systems, any reference to a particular cell configuration are intended to also represent similar components in other cell configurations, where applicable.

Figure 1:
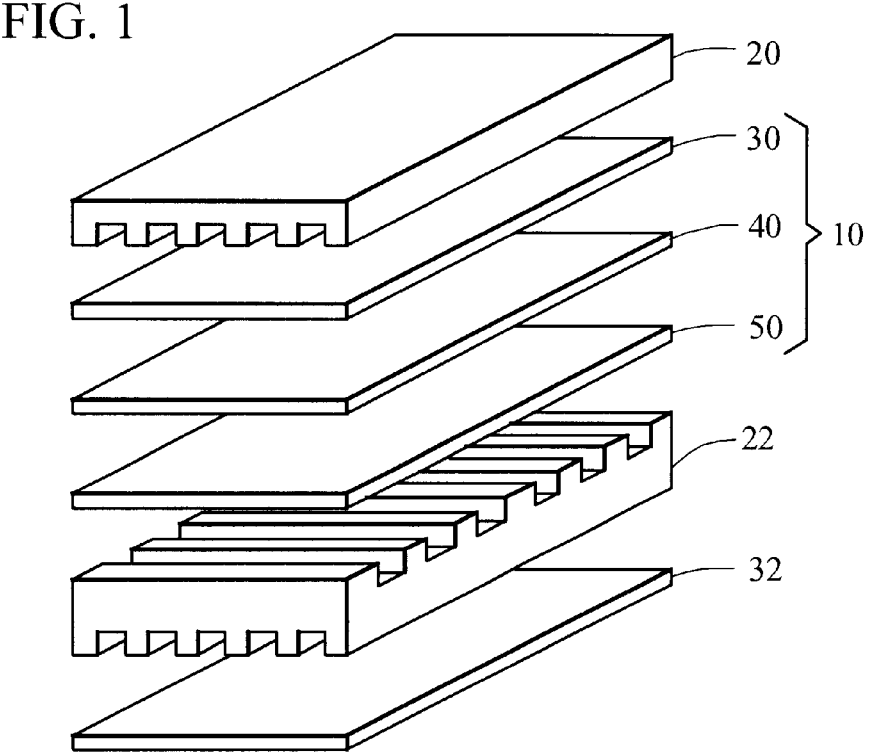
FIG. 1 is a perspective view of an exemplary electrochemical cell of a SOFC.

One configuration of a SOFC includes a stack of planar SOFC, with an electrochemical cell (or fuel cell) 10 of a stack, illustrated in FIG. 1. A fuel electrode (or anode) 30 and an oxygen electrode (or cathode) 50 are disposed on opposite sides of a solid electrolyte 40 to form an electrochemical cell 10. Two interconnects (or current collectors) 20, 22 are disposed on opposite sides of the electrochemical cell 10. An additional anode 32 is disposed adjacent to interconnect 22 to illustrate the placement of and ability to stack several electrochemical cells connected to electrochemical cell 10.

The solid electrolyte 40 of the electrochemical cell 10 can be an ion conductor capable of transporting oxygen ions from the cathode 50 to the anode 30, which is compatible with the environment in which the SOFC will be utilized (e.g., temperatures of about 600° C. up to about 1,000° C.). Generally, solid electrolyte materials include conventional materials, such as ceramics (e.g., perovskite, fluorite, and the like) and/or metals (e.g., alloys, oxides, gallates, and the like), including zirconium, yttrium, calcium, cerium, magnesium, aluminum, rare earths, and the like, as well as oxides, gallates, aluminates, combinations, and composites comprising at least one of the foregoing materials. Preferably the electrolyte is a rare earth oxide (such as yttria, gadolinia, neodymia, ytterbia, erbia, ceria, and the like) doped with aliovalent oxide(s) (such as magnesia, calcia, strontia, and the like, and other $^{+}2$ valence metal oxides). More preferably, a yttria-stabilized zirconia electrolyte is utilized in the SOFC.

The anode 30 and cathode 50, which form phase boundaries (gas/electrolyte/catalyst particle; commonly known as triple points) with the electrolyte 40, can be disposed adjacent to or integral with the electrolyte 40. The anode 30 and cathode 50 are generally formed of a porous material capable of functioning as an electrical conductor and capable of facilitating the appropriate reactions. The porosity of these materials should be sufficient to enable dual directional flow of gases (e.g., to admit the fuel or oxidant gases and permit exit of the byproduct gases), with a porosity of about 20% to about 40%, typically preferred.

The composition of the anode 30 and cathode 50 can comprise elements such as zirconium, yttrium, nickel, manganese, strontium, lanthanum, and, oxides, alloys, and combinations comprising at least one of the foregoing elements. Preferably, the anode material is formed upon a ceramic skeleton, such as yttria-stabilized zirconia, for thermal compatibility.

Both the anode 30 and the cathode 50 can be formed on the electrolyte 40 by a variety of techniques including sputtering, chemical vapor deposition, screen printing, spraying, dipping, painting, and stenciling, among others. The electrodes are typically up to about 1,000 microns or so in thickness, with a thickness of about 10 microns to about 50 microns typically preferred. An anode supported cell can also be used by forming the electrolyte 40 and the cathode 50 on the anode 30 by any of the above techniques. Alternate constructions are also contemplated with the cathode 50 or an inert layer (not shown) substituted as the support for the fuel cell.

The electrochemical cell 10 can be electrically connected with other electrochemical cells by using an interconnect 20, 22. Depending upon the geometry of the SOFC, the fuel and the oxidant flow to the anode or cathode (as appropriate) via the passageways of the interconnect 20, 22. The interconnect 20, 22 is generally formed of a material capable of withstanding the pressures and temperatures of the SOFC, and capable of conducting electricity. For example, suitable interconnects can be ceramic or metallic in the form of plates, foils, felts, mats, fibers (chopped, woven, non-woven, long, and the like), and the like, and combinations comprising at least one of the foregoing, which are capable of withstanding automobile operating conditions (e.g., ambient temperatures of about −40° C. up to operating temperatures of about 1,000° C.). The interconnect 20, 22 can be an electrically conductive material that is compatible with the oxidizing or reducing nature of the fuel cell environment. Some possible interconnects can comprise materials such as silver, copper, ferrous materials, strontium, lanthanum, chromium, chrome, gold, platinum, palladium, nickel, titanium, conducting ceramics (e.g., doped rare earth oxides of lanthanum, chromium, manganese, cobalt, nickel, and the like; doped zirconia, including, zirconia doped with titanium, copper, and the like), and the like, as well as alloys, oxides, cermets, composites, and combinations comprising at least one of the foregoing materials.

Each individual electrochemical cell 10 comprising a single anode 30, a single electrolyte 40, and a single cathode 50, generates a relatively small voltage, generally from about 0.5 to about 1.2 volts. Higher voltages are attained by electrically connecting a plurality of electrochemical cells in series to form a stack. The total number of cells forming a stack can range from 2 to several hundred, depending on power requirements, space and weight restrictions, economics, and the like.

Figure 2:
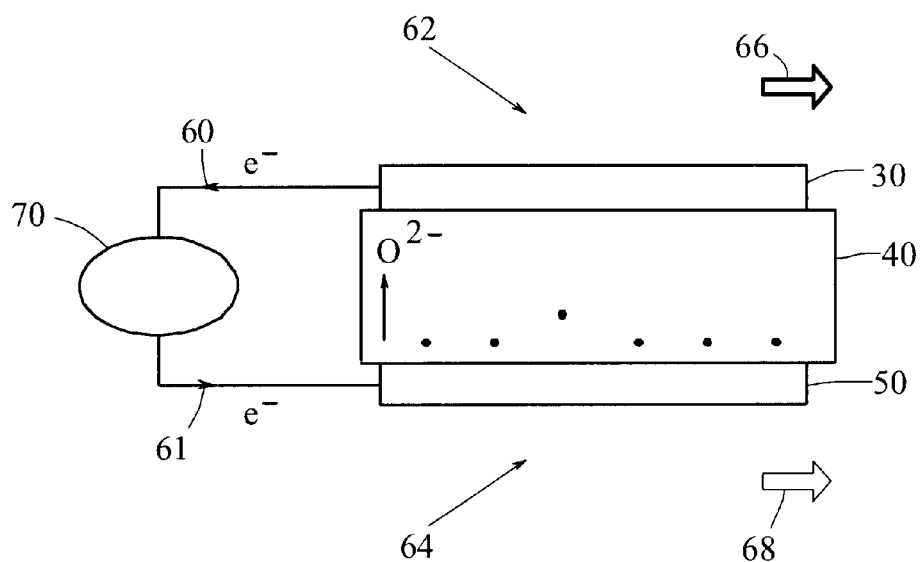
FIG. 2 is a schematic of an electrochemical cell of a SOFC in operation.

In operation, the electrochemical cell 10 produces a current flow as illustrated by current flow arrows 60, 61 in FIG. 2. Oxidant gases, such as oxygen or air, can be introduced to the cathode side of the cell, flowing as illustrated by the oxidant flow arrow 64. The oxidant receives the flowing electrons ($e^-$) and converts them into oxygen ions ($O^{-2}$), which diffuse through the electrolyte 40 to the anode 30, as depicted in the following reaction:

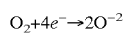
$O_2 + 4e^- \rightarrow 2O^{-2}$

At the anode, the oxygen ions react with a fuel, such as hydrogen, carbon monoxide, methane, or other hydrocarbons, which was introduced to the electrochemical cell 10 as illustrated by the fuel flow arrow 62. The reaction of the fuel and oxygen ions, producing electrons ($e^-$), which flow outside of the electrochemical cell 10 to the external circuit 70 and back to the cathode 50. The fuel/oxygen ion reaction is depicted in the following reactions:

$H_2 + O^{-2} \rightarrow H_2O + 2e^-$ (when fuel is hydrogen)

$CO + O^{-2} \rightarrow CO_2 + 2e^-$ (when fuel is carbon monoxide)

$CH_4 + 4O^{-2} \rightarrow 2H_2O + CO_2 + 8e^-$ (when fuel is methane)

Unreacted fuel and byproducts, such as water, carbon monoxide, and carbon dioxide, exit the electrochemical cell 10 in the fuel stream, as illustrated by fuel stream arrow 66, while excess oxidant exits the electrochemical cell 10, as illustrated by oxidant stream arrow 68.

Basically, the electrolyte 40 conducts these oxygen ions ($O^{-2}$) between the anode 30 and the cathode 50, maintaining an overall electrical charge balance. The cycle of flowing electrons ($e^-$) from the anode 30 through the external circuit 70 to the cathode 50 creates electrical energy for harnessing.

To facilitate the reaction in the fuel cell, a direct supply of the fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, and availability. Possible sources of fuel include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative fuels, such as hydrogen, biofuels, dimethyl ether, and others; and combinations comprising at least one of the foregoing fuels. The preferred fuel is typically based upon the power density of the engine, with lighter fuels, i.e., those which can be more readily vaporized and/or conventional fuels which are readily available to consumers, generally preferred.

The processing or reforming of hydrocarbon fuels, such as gasoline, is completed by a reformer to provide an immediate fuel source for rapid start up of the fuel cell as well as protecting the fuel cell by removing impurities. Fuel reforming can be used to convert a hydrocarbon (such as gasoline) or an oxygenated fuel (such as methanol) into hydrogen ($H_2$) and byproducts (e.g., carbon monoxide (CO)

and carbon dioxide ($CO_2$)). Common approaches include steam reforming, partial oxidation, and dry reforming.

While the fuel cell operates, oxygen ions flow through the electrolyte 40 to the anode 30 to combine with components of the fuel (e.g., $H_2$ or carbon monoxide) to produce residual components, such as water and $CO_2$. These components exit the electrochemical cell 10 in the fuel stream 66. As long as an adequate supply of fuel is present oxygen ions will leave the electrochemical cell 10. However, during startup or shutdown, when the fuel supply is not flowing, an oxidizing environment can be present on the anode side of the electrochemical cell 10, resulting in the breakdown of the anode (i.e., anode oxidation). The excess oxygen ions result from oxygen remaining from the prior use of the fuel cell or from air leaking in from the manifold seals, other seals, or other defects. When anode oxidation occurs, the anode oxidizes rapidly, creating a volume change, which can result in a mechanical failure of the electrochemical cell 10.

To prevent anode oxidation, during the startup and shutdown periods, several combinations of three individual strategies may be utilized. The first strategy is the use of a stored reformate within the SOFC, which can be slowly released during the startup and shutdown periods. The second strategy is electrically applying a reverse bias to the anode to electrochemically pump the oxygen from the anode side, keeping it in a reducing environment. The last strategy is the addition of materials to the anode to prevent or slow down anode oxidation. For efficient protection of the anode, these strategies are preferably used in tandem. It has been found particularly advantageous to employ one or more of these strategies when the fuel cell temperature is about 400° C. to about 1,000° C., with about 550° C. to about 800° C. preferred, since anode oxidation typically occurs within these temperature ranges.

The use of stored reformate (e.g., stored hydrogen and/or carbon monoxide from a reformer or other source) employs a storage device (e.g., canister, a trap, container, conduit or a pipe, and combinations comprising at least one of the foregoing devices) which may optionally include a hydrogen or oxygen scavenger material. Either prior to commencing the flow of reformate from the reformer to the SOFC or after the flow of reformate from the reformer to the SOFC ceases, based upon a sensor reading or a timed interval, the stored reformats can be introduced to the anode. Preferably, sufficient reformate is introduced to the anode to react with any remaining oxygen, thereby inhibiting anode oxidation. Possible storage devices include canisters, tanks, pipes, and the like, which are disposed within or outside of the SOFC stack, yet in fluid communication with the anode. Disposed within the storage device can be a scavenger material comprising any material capable of attracting, storing, and releasing hydrogen or oxygen, such as hydrides, (e.g., magnesium based hydrides, nickel based hydrides, and the like) carbon nano-tubes, metals, and combinations comprising at least one of the foregoing materials.

The use of stored reformate can be employed alone or in conjunction with the application of a reverse bias, i.e., a negative current, to interface of the anode and the electrolyte to electrochemically pump oxygen from the anode side back to the cathode side. A reverse bias is a voltage that produces a current flow in the direction of greater resistance to the normal direct current. By applying a negative current to the anode that can be supplied from a battery system, the oxygen is pumped from the anode-electrolyte interface through the electrolyte to the cathode, keeping the anode in a reducing environment (i.e., hydrogen rich). The amount of voltage to be applied is dependent upon the amount of current that is sufficient to produce the pumping effect of oxygen and can be established by one of ordinary skill in the art. The amount of current is dependent upon the amount of oxygen present at the anode and the temperature, and can be determined by one skilled in the art. It is important to note that this process is based on the ionic properties of the electrolyte. Dependent upon the materials of the electrolyte, this strategy is typically employed, e.g., with a zirconia electrolyte, when the temperature of the fuel cell is about 500° C. or greater, with about 550° C. to about 600° C. preferred.

Finally, the reformate storage and/or reverse bias can be employed alone or in combination with the addition of a dopant to the anode. The addition of a material (or dopant) to the anode prevents or slows down the effects of anode oxidation. In essence, the dopant scavenges the majority, or all, of the oxygen present at the anode, removing the oxygen before damaging the anode. Since oxygen destroys the anode, the anode can be doped with a material that does not readily form oxides. Basically, the anode is either combined with and/or coated with an oxidation inhibitive material. The dopant can be any non-oxidative (i.e., does not readily form oxides at about 400° C. to about 600° C. when exposed to oxygen ions), electrically conductive material, which preferably possesses similar properties as the anode, e.g., conductivity, coefficient of thermal expansion, and the like. Possible dopant materials includes, but is not limited to, ceria, pervoskites, zirconia, copper, platinum, rhodium, palladium, gadolinium, gold, and the like, and mixtures comprising at least one of the foregoing dopant materials.

The dopant can be employed using by a variety of techniques including sputtering, chemical vapor deposition, screen printing, spraying, dipping, painting, and stenciling, among others where the anode and dopant are first mixed and then formed. The dopant and the anode will retain the electrical conductivity and catalytic properties required for electrochemical activity.

The use of one or more of these anti-anode oxidative strategies inhibits anode oxidation and extends fuel cell life, rendering the fuel cell more adept for use in automotive applications.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of preventing anode oxidation in a fuel cell, comprising:
    applying a negative current to an anode of said fuel cell if less than a predetermined amount of fuel is present at said anode, said negative current configured to reverse a bias between said anode and a cathode generating a positive current therebetween when more than said predetermined amount is present, said anode is disposed in ionic communication with said cathode through an electrolyte, and
    wherein if any oxygen is present at said anode, said oxygen is transferred from said anode through said electrolyte toward said cathode.

2. The method of claim 1, wherein said applying said current is completed at temperatures of about 400° C. to about 1,000° C.

3. The method of claim 1, wherein said applying said current is completed at temperatures of about 550° C. to about 800° C.

4. The method of claim 1, further comprising storing a reformate in fluid communication with said anode, wherein said storing said reformate is with materials selected from the group consisting of hydrides, carbon nano-tubes, and combinations comprising at least one of the foregoing materials; and introducing said stored reformate to said anode when said fuel cell has a temperature of about 400° C. to about 1,000° C.

5. The method of claim 4, wherein said introducing said stored reformate occurs before a flow of main reformate from a reformer to said fuel cell or after said flow of main reformate from said reformer to the fuel cell stops.

6. The method of claim 4, further comprising doping said anode with a dopant; and wherein said dopant scavenges at least a portion of oxygen present at said anode.

7. The method of claim 6, wherein said dopant is selected from the group consisting of ceria, pervoskites, zirconia, copper, platinum, rhodium, gadolinium, gold, and palladium, and compositions comprising at least one of the foregoing dopants.

8. The method of claim 6, wherein said doping said anode further comprises mixing said dopant with a material to form said anode.

9. The method of claim 6, wherein said doping said anode further comprises coating said anode with said dopant.

10. The method of claim 1, further comprising doping said anode with a dopant; and wherein said dopant scavenges at least a portion of oxygen present at said anode.

11. The method of claim 10, wherein said dopant is selected from the group consisting of ceria, pervoskites, zirconia, copper, platinum, rhodium, gadolinium, gold, and palladium, and mixtures comprising at least one of the foregoing dopants.

12. The method of claim 10, wherein said doping said anode further comprises mixing said dopant with a material to form said anode.

13. The method of claim 10, wherein said doping said anode further comprises coating said anode with said dopant.

14. The method of claim 1, wherein said fuel cell is a solid oxide fuel cell.

15. A method of preventing anode oxidation in a fuel cell, comprising:
doping an anode of said fuel cell with a dopant, said anode is disposed in ionic communication with a cathode through an electrolyte, and wherein said dopant is configured to scavenge at least a portion of oxygen present at said anode when less than a predetermined amount of fuel is present at said anode.

16. The method of claim 15, wherein said dopant is selected from the group consisting of ceria, pervoskites, zirconia, copper, platinum, rhodium, gadolinium, gold, and palladium, and mixtures comprising at least one of the foregoing dopants.

17. The method of claim 15, wherein said doping said anode further comprises mixing said dopant with a material to form said anode.

18. The method of claim 15, wherein said doping said anode further comprises coating said anode with said dopant.

19. The method of claim 15, further comprising storing a reformate in fluid communication with said anode, wherein said storing said reformate is with materials selected from the group consisting of hydrides, carbon nano-tubes, and combinations comprising at least one of the foregoing materials; and introducing said stored reformate to said anode when said fuel cell has a temperature of about 400° C. to about 1,000° C.

20. The method of claim 15, wherein said fuel cell is a solid oxide fuel cell.

21. A method of preventing anode oxidation in a fuel cell, comprising:
storing a reformate in fluid communication with said fuel cell having an anode and a cathode disposed on opposite sides of an electrolyte wherein said storing said reformate is with materials selected from the group consisting of hydrides, carbon nano-tubes, and combinations comprising at least one of the foregoing materials; and
introducing said stored reformate at at least one of timed intervals and based upon said amount of oxygen present.

22. The method of claim 21, wherein said introducing said stored reformate to said anode occurs when said fuel cell has a temperature of about 400° C. to about 1,000° C.

23. The method of claim 21, further comprising determining an amount of oxygen present at said anode.

24. The method of claim 21, wherein said fuel cell is a solid oxide fuel cell.

25. A method of preventing anode oxidation in a fuel cell, comprising:
applying a negative current to an anode of said fuel tell if less than a predetermined amount of fuel is present at said anode, said anode is disposed in ionic communication with said cathode through an electrolyte, wherein if any oxygen is present at said anode when less than said predetermined amount, said oxygen is transferred from said anode through said electrolyte toward said cathode; and
storing a reformate in fluid communication with said anode, wherein said storing said reformate is with materials selected from the group consisting of hydrides, carbon nano-tubes, and combinations comprising at least one of the foregoing materials; and introducing said stored reformate to said anode when said fuel cell has a temperature of about 400° C. to about 1,000° C.

* * * * *